US012698682B2

(12) United States Patent
Verger

(10) Patent No.: US 12,698,682 B2
(45) Date of Patent: Aug. 4, 2026

(54) TUBULAR COMPONENT COMPRISING A THREADED CONNECTION ELEMENT

(71) Applicant: VALLOUREC OIL AND GAS FRANCE, Aulnoye-Aymeries (FR)

(72) Inventor: Eric Verger, Meudon (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 0 days.

(21) Appl. No.: 18/869,661

(22) PCT Filed: May 26, 2023

(86) PCT No.: PCT/EP2023/064252
§ 371 (c)(1),
(2) Date: Nov. 26, 2024

(87) PCT Pub. No.: WO2023/232707
PCT Pub. Date: Dec. 7, 2023

(65) Prior Publication Data
US 2025/0369292 A1 Dec. 4, 2025

(30) Foreign Application Priority Data
May 31, 2022 (FR) ...................................... 2205219

(51) Int. Cl.
*E21B 17/042* (2006.01)
*F16L 15/00* (2006.01)

(52) U.S. Cl.
CPC .......... *E21B 17/042* (2013.01); *F16L 15/001* (2013.01)

(58) Field of Classification Search
CPC ......... F16L 47/16; F16L 25/021; F16L 25/04; F16L 15/002; F16L 15/001; F16L 15/08; F16L 15/006; E21B 17/042
See application file for complete search history.

(56) References Cited

U.S. PATENT DOCUMENTS

| | | | |
|---|---|---|---|
| 5,895,079 A | 4/1999 | Carstensen et al. | |
| 6,186,558 B1 * | 2/2001 | Komolrochanaporn | ..................... |
| | | | F16L 55/00 |
| | | | 285/423 |

(Continued)

FOREIGN PATENT DOCUMENTS

| | | |
|---|---|---|
| GB | 2 038 977 A | 7/1980 |

OTHER PUBLICATIONS

International Search Report & Written Opinion issued Aug. 3, 2023 in PCT/EP2023/064252, filed on May 26, 2023, 6 pages.

*Primary Examiner* — Aaron M Dunwoody

(74) *Attorney, Agent, or Firm* — Oblon, McClelland, Maier & Neustadt, L.L.P.

(57) ABSTRACT

A tubular component for a tubular threaded joint, said tubular component including a main body and a threaded connection element, said threaded connection element extending axially from the main body to a free end of the tubular component, the threaded connection element having a helical thread, the tubular component including a metal portion and a composite material portion, and the metal portion forms the free end of the tubular component, the helical thread including a first threaded portion and a second threaded portion, the metal portion including the first threaded portion, the composite material portion including the second threaded portion, the composite material portion being in radial contact with the metal portion in line with the second threaded portion.

10 Claims, 1 Drawing Sheet

(56)        References Cited

U.S. PATENT DOCUMENTS

| 6,863,313 | B1 | 3/2005 | Delange et al. | |
| 9,261,215 | B2 * | 2/2016 | Kieper | F16L 47/04 |
| 2004/0256856 | A1 * | 12/2004 | Spears | F16L 15/08 |
| | | | | 285/333 |

* cited by examiner

TUBULAR COMPONENT COMPRISING A THREADED CONNECTION ELEMENT

TECHNICAL FIELD

The invention relates to the field of tubular components and in particular tubular components intended to be assembled together to be lowered into gas or oil wells to form a drill string, a column of casing tubes or liners or else a column of production tubes.

A tubular component comprises at least one threaded connection element, this threaded connection element being intended to cooperate with the threaded connection element of a second tubular component in order to assemble these two tubular components together to form a tubular threaded joint. The tubular component may be, for example, a tube of large size (for example, about ten metres in length), a tubular sleeve (for example, a few tens of centimetres in length), or an accessory of these tubes (suspension device, section-change part, safety valve, connector for a drilling rod, etc.).

TECHNOLOGICAL BACKGROUND

Composite tubular components can be created by a variety of manufacturing methods, and in particular by a technique known as filamentary winding in which a resin-impregnated fibre is helically wound around a mandrel, and the composite tubular component results from covering the mandrel with the composite material formed by the resin-impregnated fibre.

By comparison with tubular components made of metal such as steel, composite tubular components are considerably lighter. In addition, composite tubular components do not corrode, which is advantageous, for example, in underwater applications.

It is known practice to machine the ends of the tubular components in order to form threads for connecting the tubular components to one another. However, threaded connections in the composite material are not suitable for applications involving high loads.

Specifically, a drawback of composite tubular components compared with conventional tubular components made of metal is that the introduction of stresses into the ends of the composite tubular components can be problematic, particularly when the stress is high. Ideally, the connection at the ends of the composite tubular component should be at least as strong as the body of the tubular component.

Document U.S. Pat. No. 9,470,350 B2 discloses tubular components made of composite material and comprising a main body made of composite material associated with metal end connectors for connecting tubular components to one another. However, as indicated in that document, such an assembly is complex and has a weakness particularly at the composite/metal interface. Also known is document U.S. Pat. No. 5,895,079, which relates to a threaded connection using composite materials.

SUMMARY

One idea underlying the invention is to provide a lightweight tubular component having good mechanical resistance to stresses. In particular, one idea underlying the invention is to provide a composite tubular component comprising a metal connector and having satisfactory strength at the composite/metal interface.

According to one embodiment, the invention provides a tubular component for a tubular threaded joint, said tubular component comprising a main body and a threaded connection element, said threaded connection element extending axially from the main body to a free end of the tubular component, the threaded connection element comprising a helical thread, wherein the tubular component comprises a metal portion and a composite material portion, and wherein the metal portion forms the free end of the tubular component, the helical thread comprising a first threaded portion and a second threaded portion, the metal portion comprising the first threaded portion, the composite material portion comprising the second threaded portion, the composite material portion being in radial contact with the metal portion in line with the second threaded portion.

By virtue of these features, the tubular component has satisfactory weight and strength.

The metal portion provides high stress resistance at the helical thread.

The fact that a portion of the thread, in this case the second threaded portion, is formed by the composite material portion makes it possible to maximize the part of the tubular component made of composite material, making it possible to minimize the weight of the tubular component while maintaining good mechanical behaviour because of the first threaded portion formed by the metal portion.

The radial contact between the composite material portion and the metal portion in line with the second threaded portion makes it possible to radially arrange a zone of connection between the metal portion and the composite material portion between the metal portion and said second threaded portion. Thus, when the tubular component is in a state in which it is mounted with a second threaded tubular component, said zone of connection between the metal portion and the composite material portion is radially wedged between a portion of the second tubular component cooperating with the second threaded portion and the metal portion. The zone of connection between the metal portion and the composite material portion is thus maintained mechanically stable and reliable with regard to stresses by being wedged between the second tubular component and the metal portion.

In a mounted state, the tubular component is associated with a second tubular component by cooperation between the threaded connection element of the tubular component and a second threaded connection element, said second threaded connection element being formed on the second tubular component. Typically, in such a mounted state, the helical thread of the tubular component is screwed with a second helical thread, said second helical thread being formed by the second threaded connection element.

An axially extending element has an axial component, that is to say along a longitudinal axis of the tubular component. Thus, the threaded connection element extending axially from the main body to a free end of the tubular component develops along the longitudinal axis of the tubular component between the main body and the free end of the tubular component.

The term "composite material" designates a material produced by the combination of a matrix and of reinforcing fibres extending into the matrix. This term includes any fibre-reinforced plastics material. The matrix may be produced by any suitable binder material, including thermosetting resins such as epoxy or polyester resins, or alternatively certain thermoplastic materials. The reinforcing fibres may comprise one or more elements from among, for example, glass fibres, carbon fibres, boron fibres, polyethylene fibres, polypropylene fibres, polyamide fibres, alumina fibres, and other synthetic and organic fibres. Such a composite material takes the form of a coil of composite material comprising a continuous fibre yarn impregnated with resin. This continuous fibre yarn is, for example, produced by braiding, spinning, weaving or any other method that makes it possible to obtain a fibre coil that can be impregnated with resin. Such coils may also be formed from pre-impregnated fibres.

The term "tooth" makes it possible to schematically illustrate a longitudinal section of the thread, a tooth denoting a complete thread turn of 360° around the axis of revolution of the thread.

According to some embodiments, such a tubular component may comprise one or more of the following features.

According to one embodiment, the metal portion has a first connecting surface, and the composite material portion has a second connecting surface, the first connecting surface and the second connecting surface being in contact and jointly forming a junction zone between the metal portion and the composite material portion, said junction zone having a radial component and an axial component.

By virtue of these features, the connection between the metal portion and the composite material portion is made over a large contact area, said connection extending both radially and axially.

The junction zone between the metal portion and the composite material portion may take many different configurations. According to one embodiment, the junction zone is planar and inclined with respect to the longitudinal axis of the tubular component. In other words, the metal portion comprises a first frustoconical portion forming the first connecting surface, and the composite material portion has a second frustoconical portion forming the second connecting surface, said first frustoconical portion and said second frustoconical portion being in contact so as to form the junction zone between the metal portion and the composite material portion. According to one embodiment, the junction zone is stepped along the longitudinal axis of the tubular component. In other words, the first connecting surface is stepped along the longitudinal axis of the tubular component, and the second connecting surface is stepped along the longitudinal axis of the tubular component. According to one embodiment, the junction zone is crenelated. In other words, the first connecting surface is crenelated and the second connecting surface is crenelated. According to one embodiment, the first connecting surface comprises an alternation of planar surfaces and grooves, and the second connecting surface comprises an alternation of planar surfaces and grooves, the planar surfaces of the first connecting surface being in contact with the bottom of corresponding grooves of the second connecting surface, and vice versa.

Preferably, the metal portion has a decreasing radial thickness from a junction between the first threaded portion and the second threaded portion and axially away from the free end of the tubular component.

By virtue of these features, the junction zone may be maximized by having an axial component without requiring an increase in the radial thickness of the tubular component.

Preferably, said reduction in radial thickness of the metal portion is progressive. Such a progressive reduction allows a smooth transition between the zone of the tubular component formed by the metal portion and the zone of the tubular component formed by the composite material portion, such a smooth transition not generating any stress concentration at the junction zone between the metal portion and the composite material portion when the tubular component is subjected to stresses.

According to one embodiment, the tubular component comprises a first radial surface and a second radial surface, the first radial surface being radially opposite the second radial surface, the thread being arranged on said first radial surface, the metal portion forming at least part of said second radial surface. According to one embodiment, the first radial surface is radially outside the second radial surface. In other words, according to this embodiment, the threaded connection element is a male connection element.

According to one embodiment, the first radial surface is radially inside the second radial surface. In other words, according to this embodiment, the threaded connection element is a female connection element.

According to one embodiment, an end of the metal portion opposite the free end of the tubular component has a minimum radial thickness of the metal portion.

According to one embodiment, the second radial surface of the tubular component is partially formed by the end of the metal portion opposite the free end of the tubular component.

According to one embodiment, the end of the metal portion opposite the free end of the tubular component is axially offset from a junction between the first threaded portion and the second threaded portion.

According to one embodiment, an end of the metal portion opposite the free end of the tubular component is axially offset from a junction between the main body and the threaded connection element.

By virtue of these features, the transition zones in the tubular component, namely said end of the thread, the end of the metal portion or else the junction between the first threaded portion and the second threaded portion, are distributed axially in the tubular component. This axial distribution of the transition zones ensures good mechanical strength of the tubular component, in particular because it avoids the presence of a zone having low mechanical strength owing to the presence of a plurality of axially grouped transition zones.

According to one embodiment, an axial length of the metal portion is greater than an axial length of the threaded connection element.

In other words, according to one embodiment, the end of the metal portion opposite the free end of the tubular component is located axially in the body of the tubular component.

By virtue of these features, it is ensured that the end of the metal portion is axially offset from the end of the thread, with the resulting advantages explained above.

In addition, the end of the metal portion located in the body of the tubular component makes it possible to position the stress concentration zone imposed by the transition between the end of the metal portion and the composite material portion in a zone where the composite material portion has the greatest thickness and therefore the best mechanical strength. Consequently, this stress concentration zone has a limited impact on the mechanical strength of the tubular component.

Also by virtue of these features, the composite material portion forming the second threaded portion is integrally interposed between said second threaded portion and the metal portion. Thus, the zone of connection between the composite material portion and the metal portion is well supported mechanically by the cooperation between the threads of the tubular component and of the second tubular component with which the tubular component is associated to form the tubular threaded joint.

According to one embodiment, the first threaded portion comprises at least three teeth.

By virtue of these features, the tubular component has good mechanical strength. Specifically, the applicant has observed that the first teeth of the thread starting from the free end of the tubular component were subject to particularly significant stresses. Thus, the production of these first teeth in the metal portion offers high mechanical strength properties.

According to one embodiment, the axial length of the second threaded portion is at least equal to 25% of an axial length of the thread.

By virtue of these features, it is ensured that the junction between the first threaded portion and the second threaded portion is not located too close to the end of the thread opposite the free end of the tubular component. Specifically, the applicant has observed that, in a similar manner to the end of the thread located close to the free end of the tubular component, the end of the thread opposite the free end of the tubular component is also subject to significant stresses. Thus, by virtue of the axial length of the second threaded portion as defined above, it is ensured that the junction between the first threaded portion and the second threaded portion, which constitutes a transition zone and therefore a mechanically weak zone, is not located in a highly stressed zone of the thread, typically the end of the thread opposite the free end of the tubular component.

In other words, the applicant has observed that both ends of the thread were subject to significant stresses. Consequently, by virtue of the above features, the applicant ensures that the transition zones between the metal portion and the composite material portion, typically the junction between the first threaded portion and the second threaded portion or else the junction between the end of the metal portion opposite the free end of the tubular component and the composite material portion, which are mechanically more fragile zones, are not located in the zones of the tubular component that are subject to significant stresses.

According to one embodiment, the second threaded portion develops over a radial thickness of between 25% and 75% of a radial thickness over which the thread develops.

By virtue of these features, the junction between the first threaded portion and the second threaded portion is arranged substantially at the centre of the thread, thus preventing said junction from being located in a zone of high stress.

According to one embodiment, the body of the tubular component comprises an inner coating, said inner coating being made of corrosion-resistant material.

According to one embodiment, the metal portion develops axially in the body of the tubular component over an axial length greater than or equal to 50% of the axial length of the thread.

By virtue of these features, the junction between the metal portion and the composite material portion is smooth and the end of the metal portion is sufficiently distant from the end of the thread opposite the free end of the tubular component to ensure a good distribution of the mechanically fragile zones, as explained above.

Preferably, the metal portion develops axially in the body of the tubular component over an axial length less than twice the length of the threaded connection element. Specifically, in order to maintain a satisfactory weight for the tubular component, it is appropriate to maximize the composite material portion with respect to the metal portion, and therefore the metal portion should not extend too far axially into the main body of the tubular component. In other words, the main body of the tubular component is mainly formed by the composite material portion, mainly meaning that it is completely formed by the composite material portion except for a small zone formed by the metal portion, said small zone having a reduced radial thickness owing to the decreasing radial thickness of the metal portion and a limited axial length compared with the axial length of the main body.

According to one embodiment, the metal portion is made of a metal whose Young's modulus (for example between 180 and 220 GPa) is greater than the Young's modulus of the composite material (for example between 20 and 150 GPa).

According to one embodiment, the metal portion may be made of steel.

According to one embodiment, the thread is formed on an outer surface of the tubular component or on an inner surface of the tubular component.

The invention thus provides a lightweight tubular component owing to the large proportion of composite material. This tubular component also has good mechanical strength characteristics owing to the presence of the metal portion. This tubular component also has a connection between the metal portion and the composite material portion that is mechanically reliable with respect to stresses owing to the positioning of this connection radially between the metal portion and a second tubular component and owing to the axial offset of the transition zones representing mechanically fragile zones.

According to one embodiment, the invention also provides a tubular threaded joint comprising a first tubular component equipped with a first threaded connection element and a second tubular component equipped with a second threaded connection element, the second threaded connection element being screwed with the first threaded connection element, at least one of the first tubular component and second tubular component being produced as mentioned above.

According to one embodiment, the first tubular component and the second tubular component are produced as mentioned above.

BRIEF DESCRIPTION OF THE FIGURES

The invention will be better understood, and additional objectives, details, features and advantages thereof will become more clearly apparent, from the description below of several specific embodiments of the invention given solely in an illustrative and non-limiting manner, with reference to the attached drawings.

DESCRIPTION OF THE EMBODIMENTS

In the description and the figures, the axis X corresponds to the axis of revolution of the tubular component or, when two tubular components are combined to jointly form a threaded tubular joint, to the axis of revolution of such a threaded tubular joint, the axis of revolution of said threaded tubular joint then being coaxial with the respective axes of revolution of said two combined tubular components. By convention, the "radial" orientation is directed orthogonally to the axis X and the "axial" orientation is directed parallel to the axis X. The terms "outer" and "inner" are used to define the relative position of an element with reference to the axis X. An element close to the axis X is thus termed inner as opposed to an outer element situated radially at the periphery.

Figure 1:
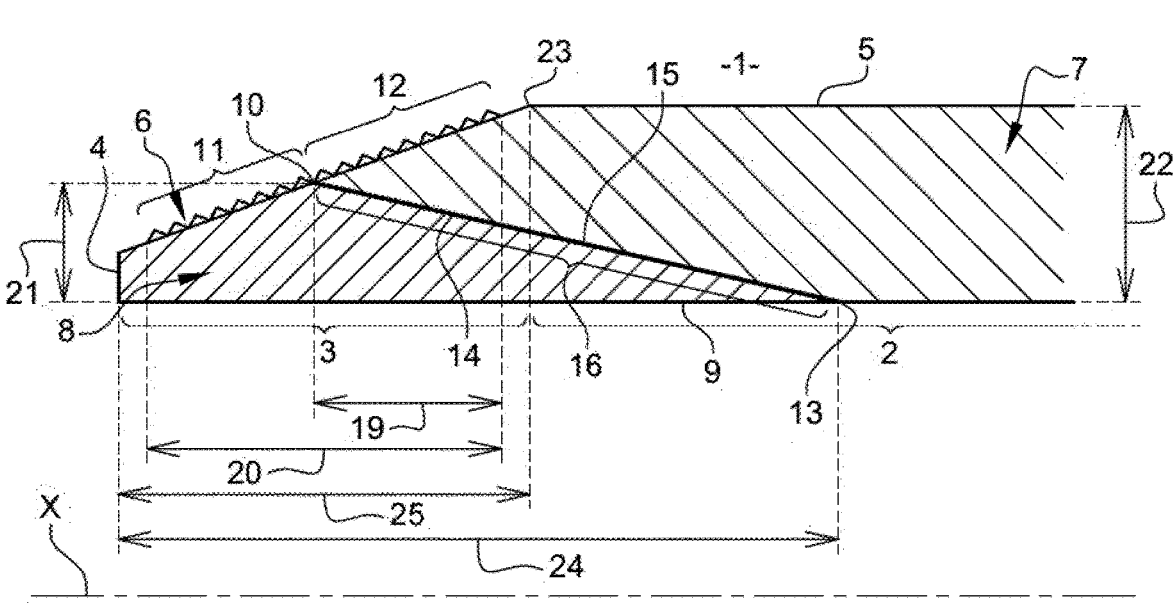
FIG. 1 shows a partial sectional view of a tubular component.

With reference to FIG. 1, a tubular component 1 according to one embodiment is described below. The tubular component 1 comprises a main body 2 and a threaded connection element 3. The main body 2 is tubular in shape along the axis of revolution X. The threaded connection element 3 extends axially from the main body 2 to a free end 4 of the tubular component 1, an end of the threaded connection element 3 opposite the main body 2 forming the free end 4 of the tubular component 1.

In the embodiment illustrated in FIG. 1, the threaded connection element 3 is of the male type, that is to say it has a thread 6 on a radially outer face 5 of the tubular component 1. However, the invention applies similarly to a connection of the female type, that is to say having a threaded connection element whose thread is formed on a radially inner face of the tubular component, as explained below.

The threaded connection element 3 has a radial thickness decreasing along the axis X from the main body 2 of the tubular component 1 towards the free end 4 of the tubular component 1. The thread 6 has an inclination with respect to the axis X. In addition, the threaded connection element 3 has a minimum radial thickness at the free end 4 of the tubular component 1.

Only the thread 6 is illustrated and described below with reference to FIG. 1; however, the threaded connection element 3 may take many distinct forms depending on the type of threaded tubular joint desired. By way of non-limiting examples, the threaded connection element could have one or more sealing bearing surfaces, one or more stop surfaces, one or more stages, one or more threads, a greater or lesser thread inclination with respect to the axis X, for example 6%, etc.

The tubular component 1 comprises a composite material portion 7 and a metal portion 8.

The composite material portion 7 comprises a plurality of layers of fibres stacked radially on one another. For the manufacture of the tubular component 1, the composite material is, in an initial state, in the form of a fibre yarn coil, the fibres being, for example, braided, spun, woven or knitted fibres or the like, said yarn being impregnated or pre-impregnated by a matrix. This fibre coil is made of a composite material composed, for example, of glass fibres and epoxy resin.

In order to shape the composite material portion 7 of the tubular component 1, a filamentary winding manufacturing process is preferably used. During this manufacturing process, the fibre yarn is wound helically and in a first axial direction around a mandrel, said mandrel extending along the axis X. Then, when one end of the composite material portion 7 is reached, the fibre yarn is wound helically in a second axial direction opposite the first axial direction in order to radially superimpose the fibre yarn being coated on the preceding layer. This alternation is reproduced over several layers which are superimposed until the desired radial thickness is obtained for the composite material portion 7.

The metal portion 8 is arranged at the end of the tubular component 1. More particularly, the metal portion 8 forms the free end 4 of the tubular component 1.

The metal portion 8 partially forms the threaded connection element 3. In addition, the metal portion 8 partially forms the main body 2 of the tubular component 1. In other words, the metal portion 8 develops axially both in the threaded connection element 3 and in the main body 2.

Similarly, the composite material portion 7 partially forms the threaded connection element 3. In addition, the composite material portion 7 partially forms the main body 2 of the tubular component 1. In other words, the composite material portion 7 develops axially both in the threaded connection element 3 and in the main body 2. Thus, the threaded connection element 3 is formed both by the metal portion 8 and by the composite material portion 7 and, similarly, the main body 2 is formed both by the metal portion 8 and the composite material portion 7.

The radially outer face 5 of the tubular component 1 is formed by the composite material portion 7 alone in the main body 2. The radially outer face 5 of the tubular component 1 is formed jointly by the composite material portion 7 and the metal portion 8 in the threaded connection element 3. A radially inner face 9 of the tubular component 1 is formed by the metal portion 8 alone in the threaded connection element 3. Said radially inner face 9 of the tubular component 1 is formed jointly by the metal portion 8 and the composite material portion 7 in the main body 2.

The radially outer face 5 of the tubular component has, at the threaded connection element 3, an outer junction 10 between the metal portion 8 and the composite material portion 7. Since the thread 6 is made on the radially outer face 5 of the tubular component 1 at the threaded connection element 3, the thread 6 has a first threaded portion 11 formed by the metal portion 8 and a second threaded portion 12 formed by the composite material portion 7, said first threaded portion 11 and second threaded portion 12 being contiguous at the outer junction 10. Similarly, the radially inner face 9 of the tubular component has an inner junction 13 between the part of said radially inner face 9 formed by the metal portion 8 and the composite material portion 7.

The radial thickness of the metal portion 8 increases along the axis X from the free end 4 of the tubular component 1 to the outer junction 10. Conversely, the radial thickness of the metal portion 8 decreases along the axis X from said outer junction 10 to the inner junction 13. The metal portion 8 has a first connecting surface 14 between the outer junction 10 and the inner junction 13.

In the embodiment illustrated in FIG. 1, this first connecting surface 14 is planar and inclined with respect to the axis X, the metal portion 8 having a maximum radial thickness at the outer junction 10 and a minimum radial thickness at the inner junction 13. During the manufacture of the tubular component 1, the first connecting surface 14 serves as a support for the winding of the composite material in place of the mandrel at the threaded connection element 3 and part of the main body 2 axially located between the threaded connection element 3 and the inner junction 13. Thus, the composite material portion 7 forms a second connecting surface 15 which is in contact with the first connecting surface 14, the metal portion 8 and the composite material portion 7 being connected together at a junction zone 16 created by the contact between the first connecting surface 14 and the second connecting surface 15. Typically, this junction zone 16 develops between the outer junction 10 and the inner junction 13.

However, the connection between the metal portion 8 and the composite material portion 7 at the junction zone 16 constitutes a transition between two distinct materials and therefore a zone of weakness in the tubular component 1, in particular when the tubular component 1 is subject to significant stresses. It is therefore important to ensure that the connection between the composite material portion 7 and the metal portion 8 at said junction zone 16 is as stable and reliable as possible.

Figure 2:
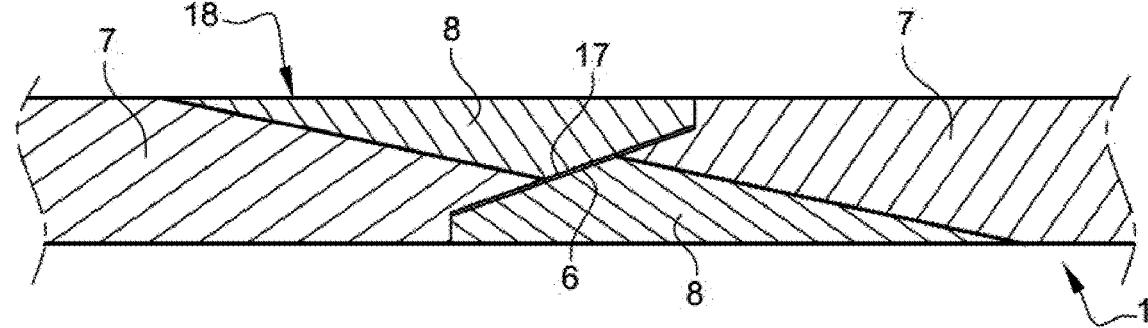
FIG. 2 is a partial sectional view of a tubular component of FIG. 1 associated with a second tubular component in order to form a tubular threaded joint.

For this purpose, as illustrated in FIG. 2, this junction zone 16 is arranged radially between the metal portion 8 and at least part of the thread 6 intended to cooperate with a thread 17 of another tubular component 18 with which the tubular component 1 is associated. In order to ensure that the junction zone 16 is interposed radially between the metal portion 8 and the other tubular component 18, part of the thread 6, typically the second threaded portion 12, is formed by the composite material portion 7. In other words, the junction zone 16 is radially interposed between the second threaded portion 12, which is intended to cooperate with the thread 17 of said other tubular component 18, and the metal portion 8. Thus, when the tubular component 1 forms with the other tubular component 18 a threaded tubular joint, the thread 17 of the other tubular component 18 participates in keeping the second connecting surface 15 in contact with the first connecting surface 14, thus ensuring the stability of the junction zone 16.

Moreover, the reduction in the radial thickness of the metal portion 8 is preferably progressive between the outer junction 10 and the inner junction 13, thus making it possible to maximize the surface area of cooperation between the metal portion 8 and the composite material portion 7, that is to say the junction zone 16 between the first connecting surface 14 and the second connecting surface 15. This maximization of the junction zone 16 offers good strength and high reliability to the connection between the metal portion 8 and the composite material portion 7.

The applicant has observed that significant stresses are present in the teeth of the thread 6 which are closest to the free end 4 of the tubular component 1. Thus, advantageously, the first threaded portion 11 comprises at least three teeth of the thread 6.

Similarly, the applicant has observed that significant stresses are present in the teeth of the thread 6 closest to the main body 2. Thus, advantageously, the second threaded portion 12 comprises at least three teeth of the thread 6. Preferably, the second threaded portion has an axial length 19 of between 25% and 75% of an axial length 20 of the thread 6. Ideally, the axial length 19 of the second threaded portion 12 is 50% of the axial length 20 of the thread 6.

A radial thickness of the second threaded portion is between 25% and 75% of a radial thickness of the thread 6. Such a radial thickness of the second threaded portion 12 ensures that the outer junction 10 is axially close to a centre of the thread 6, and therefore remote from the zones subject to high stresses, namely the ends of the thread 6.

According to one embodiment, a radial thickness 21 of the threaded connection element 3 at the outer junction 10 is between 25% and 75% of a radial thickness 22 of the main body 2 of the tubular component 1. Such a radial thickness 21 of the threaded connection element 3 at the outer junction 10 also ensures that said outer junction 10 is axially close to a centre of the thread 6, and therefore remote from the zones subject to high stresses, namely the ends of the thread 6.

Such a second threaded portion 12 also ensures that the junction zone 16 is interposed radially between the other tubular component 18 and the metal portion 8 over an axial length sufficient to ensure the cooperation of said other tubular component 18 to maintain the first connecting surface 14 and the second connecting surface 15 in contact.

In a tubular component 1 such as above, the structural change zones constitute zones of mechanical weakness in the tubular component 1. Thus, the outer junction 10, which, owing to the change of material, constitutes a structural transition between the first threaded portion 11 and the second threaded portion 12, is a first zone of mechanical weakness in the tubular component 1. Similarly and for the same reasons, the inner junction 13 also constitutes a zone of mechanical weakness in the tubular component 1. Finally, a junction 23 between the main body 2 and the threaded connection element 3 also constitutes a zone of mechanical weakness of the tubular component 1.

In order to provide a tubular component 1 having good mechanical strength, it is important not to group together axially these weak zones of the tubular component 1. Thus, advantageously, the inner junction 13 and the junction 23 between the main body 2 and the threaded connection element 3 are axially offset. Similarly, the inner junction 13 and the outer junction 10 are also axially offset.

In order to ensure this axial separation between the outer junction 10, the inner junction 13 and the junction 23 between the main body 2 and the threaded connection element 3, an axial length 24 of the metal portion 8 is greater than an axial length 25 of the threaded connection element 3. More particularly, the axial length 24 of the metal portion 8 is greater than or equal to 150% of the axial length 25 of the threaded connection element 3. Preferably, said axial length 24 of the metal portion 8 is less than twice the axial length 25 of the threaded connection element 3, so as not to have an excessively long metal portion 8 which would consequently increase the weight of the tubular component 1.

In the figures, only one threaded connection element 3 is illustrated, the free end of the tubular component 1 opposite the threaded connection element 3 comprising another threaded connection element, this other threaded connection element having features similar to or different from the features of the threaded connection element 3.

In other words, the tubular component 1 comprises two threaded connection elements formed on either side of the main body 2. These threaded connection elements may be either a male threaded connection element comprising a helical thread formed on the outer face 5 of the tubular component 1, as illustrated by the threaded connection element 3 in FIG. 1, or a female threaded connection element comprising a helical thread formed on the inner face 9 of the tubular component 1. The male threaded connection element 3 is thus intended to be inserted for screwing into the female threaded connection element via their respective threads, as illustrated in FIGS. 2 and 3.

Thus, a tubular component 1 may be a male/female tube of long size, namely of the order of about ten metres, comprising a male-type connection element 3 at a first end and a female-type threaded connection element at a second end. The male/female tubes are therefore connected to one another so as to form a so-called "integral" assembly, for example as illustrated in FIG. 2, that is to say without the use of an attached part connecting the tubes together.

Figure 3:
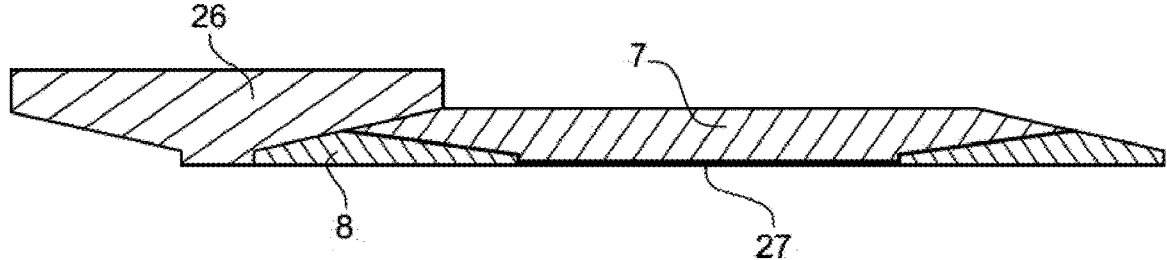
FIG. 3 is a partial sectional view of a tubular component of FIG. 1 associated with a variant of the second tubular component in order to form a variant of the tubular threaded joint.

According to another embodiment, and as illustrated in FIG. 3, the tubular component 1 may also be a male/male tube of long size, namely of the order of about ten metres, comprising a male-type threaded connection element 3 at a first end and another male-type threaded connection element at a second end. The male/male tubes are assembled using another tubular component, namely a female coupling sleeve 26 so as to form a threaded connection known as a "sleeved" connection. A female coupling sleeve 26 is a tube of small size, namely of the order of several tens of centimetres, comprising a female-type threaded connection element at a first end and another female-type threaded connection element at a second end.

In this FIG. 3, the tubular component 1 further comprises an inner coating 27. Such an inner coating 27 is preferably made of a corrosion-resistant material. Such an inner coating 27 forms the inner face 9 of the tubular component over its entire length, with the exception of the portions of said inner face 9 formed by the metal portion 8 (or the metal portions in the case where the two ends of the tubular component 1 would comprise a respective metal portion). This inner coating 27 allows better wear resistance of the tubular component, in particular with regard to corrosion.

Assembling a plurality of tubular components 1 to one another makes it possible, for example, to form a drill string, a column of casing tubes or liners or else a column of production tubes for a gas or oil well.

Although the invention has been described in conjunction with several particular embodiments, it is quite obvious that it is in no way limited thereto and that it comprises all the technical equivalents of the means described and their combinations if they fall within the scope of the invention.

Thus, the threaded connection element may comprise a thread made in several successive parts, for example in two parts separated by a central stop, by a sealing bearing surface or else by an empty space serving as a grease reservoir. In such a case, the outer junction may be located axially in one of the parts of the thread as described above or, on the contrary, in the central zone separating the two parts of the thread. In such a case, the thread nevertheless comprises a first threaded portion made in the metal portion and a second threaded portion made in the composite material portion. Thus, the junction zone between the metal portion and the composite material portion remains interposed radially between the thread and the metal portion so as to allow the cooperation of another tubular component in order to preserve this junction zone.

Similarly, the corrosion-resistant coating illustrated in FIG. 3 may be used in a similar manner in the other embodiments illustrated, for example, in FIGS. 1 and 2.

Similarly, the first connecting surface and the second connecting surface may be planar as illustrated above or of complex shape, for example by being at least partially crenelated, by comprising grooves/teeth or the like. Such connecting surfaces having complex shapes may offer a larger cooperation surface area and therefore a better connection between the metal portion and the composite material portion.

The use of the verb "have", "comprise" or "include" and its conjugated forms does not exclude the presence of elements or steps other than those set out in a claim.

In the claims, any reference sign between parentheses cannot be construed as a limitation of the claim.

The invention claimed is:

1. A tubular component for a tubular threaded joint, comprising:
a main body;
a threaded connection element, said threaded connection element extending axially from the main body to a free end of the tubular component, the threaded connection element including a helical thread;
a metal portion; and
a composite material portion,
wherein the metal portion forms the free end of the tubular component,
wherein the helical thread includes a first threaded portion and a second threaded portion,
wherein the metal portion includes the first threaded portion,
wherein the composite material portion includes the second threaded portion, and
wherein the composite material portion is in radial contact with the metal portion in line with the second threaded portion, and
wherein the metal portion has a decreasing radial thickness from a junction between the first threaded portion and the second threaded portion and axially away from the free end of the tubular component.

2. The tubular component according to claim 1, wherein the metal portion has a first connecting surface, and the composite material portion has a second connecting surface, the first connecting surface and the second connecting surface being in contact and jointly forming a junction zone between the metal portion and the composite material portion, said junction zone having a radial component and an axial component.

3. The tubular component according to claim 1, wherein the tubular component comprises a first radial surface and a second radial surface, the first radial surface being radially opposite the second radial surface, the thread being arranged on said first radial surface, the metal portion forming at least part of said second radial surface.

4. The tubular component according to claim 1, wherein an end of the metal portion opposite the free end of the tubular component is axially offset from a junction between the first threaded portion and the second threaded portion.

5. The tubular component according to claim 1, wherein an end of the metal portion opposite the free end of the tubular component is axially offset from a junction between the main body and the threaded connection element.

6. The tubular component according to claim 1, wherein an axial length of the metal portion is greater than an axial length of the threaded connection element.

7. The tubular component according to claim 1, wherein the first threaded portion comprises at least three teeth.

8. The tubular component according to claim 1, wherein an axial length of the second threaded portion is at least equal to 25% of an axial length of the thread.

9. The tubular component according to claim 1, wherein the second threaded portion develops over a radial thickness of between 25% and 75% of a radial thickness over which the thread develops.

10. The tubular component according to claim 1, wherein the main body of the tubular component comprises an inner coating, said inner coating being made of corrosion-resistant material.

* * * * *